ANTHONY R. COVIELLO
INVENTOR
HUEBNER, BEEHLER, WORREL & HERZIG
ATTORNEYS

United States Patent Office

2,900,033
Patented Aug. 18, 1959

2,900,033

AGRICULTURAL IMPLEMENT, PARTICULARLY A REVERSIBLE PLOW, AND SUPPORT VEHICLE THEREFOR

Anthony R. Coviello, Tulare, Calif.

Application October 21, 1955, Serial No. 542,067

22 Claims. (Cl. 172—212)

The present invention relates to agricultural implements and more particularly to a support vehicle for earthworking tools and the like.

The support vehicle of the present invention is especially adapted for use with reversible plows, although not limited thereto; is a companion development of the Reversible Plow of my United States Patent No. 2,600,-359; and the instant application is a continuation-in-part of my prior copending applications, S.N. 238,065, filed July 23, 1951, now Patent No. 2,732,781, issued on January 31, 1956, and S.N. 479,611, filed January 3, 1955, now Patent No. 2,824,505, issued February 25, 1958.

My above identified patent and patent applications relate to a succession of improvements, a general understanding of which will facilitate description of the present invention. The plows of said patent and patent applications each employ a plow beam which supports a plurality of plow blades mounted for substantially horizontal rotational movement on the beam and rotational adjustment about substantially erect axes. The beam, in turn, is mounted in a frame for horizontal pivotal movement between opposite operational positions relative to a line of draft. Means are provided for rotationally positioning the plow blades automatically in response to beam movement so that earth encountered by the blades is discharged laterally relative to the line of draft selectively to each side of the line of travel depending upon the position of the beam in the frame.

There are certain problems which must be overcome in the design of support vehicles for plows of this nature. The side thrust set up by the series of plow blades employed must be counteracted not only in one direction but in opposite lateral directions depending on the operational positions of the plows. Provision must be made for raising and lowering the plows from and into operating positions. The tendency of the plows to dig too deeply into the ground or lift out of effective plowing depths must be avoided. The plows preferably are as maneuverable as possible and readily adapted for use in association with the several tractor hitches in present day use. These and other problems are somewhat complicated when the plows are of large size and heavy weight.

Accordingly, an object of this invention is to provide improvements in support vehicles for earthworking implements such as plows of the character described.

Another object is to provide a support vehicle adapted automatically to counteract side thrust set up by earthworking tools borne by the vehicle and having adjustable operational positions.

Another object is to provide a support vehicle for mounting earthworking tools which is adapted for elevational adjustment to raise and to lower the tools.

Another object is to provide a support vehicle adjustably mounting earthworking tools which precludes excessive digging of the tools into the earth.

Another object is to provide a support vehicle for earthworking tools having improved maneuverability.

Another object is to provide balanced support for a frame mounting earthworking tools on opposite sides of the frame.

Another object is to provide a support vehicle for agricultural implements adapted for connection to various draft hitches.

Another object is to provide in association with a support frame, a ground engaging wheel and adjustably positionable earthworking tools on the frame, an improved mount for the wheel to enable pivotal movement of the wheel relative to the frame around substantially horizontal and vertical axes and automatic positioning of the wheel about the vertical axes in response to positioning of the tools.

Another object is to provide a support frame for agricultural implements having ground support wheels connected thereto automatically releasable for free floating movement.

Another object is to prevent free floating wheels such as mentioned in the foregoing paragraph from folding under the support frame when out of ground engagement and effectively to employ the weight of such wheels to prevent the implements from rising to the surface of the ground during operation thereof.

These and other objects will become more fully apparent upon reference to the following description.

In the drawing:

Fig. 7 is a somewhat enlarged vertical section taken on line 7—7 of Fig. 1.

Figures 1, 2:
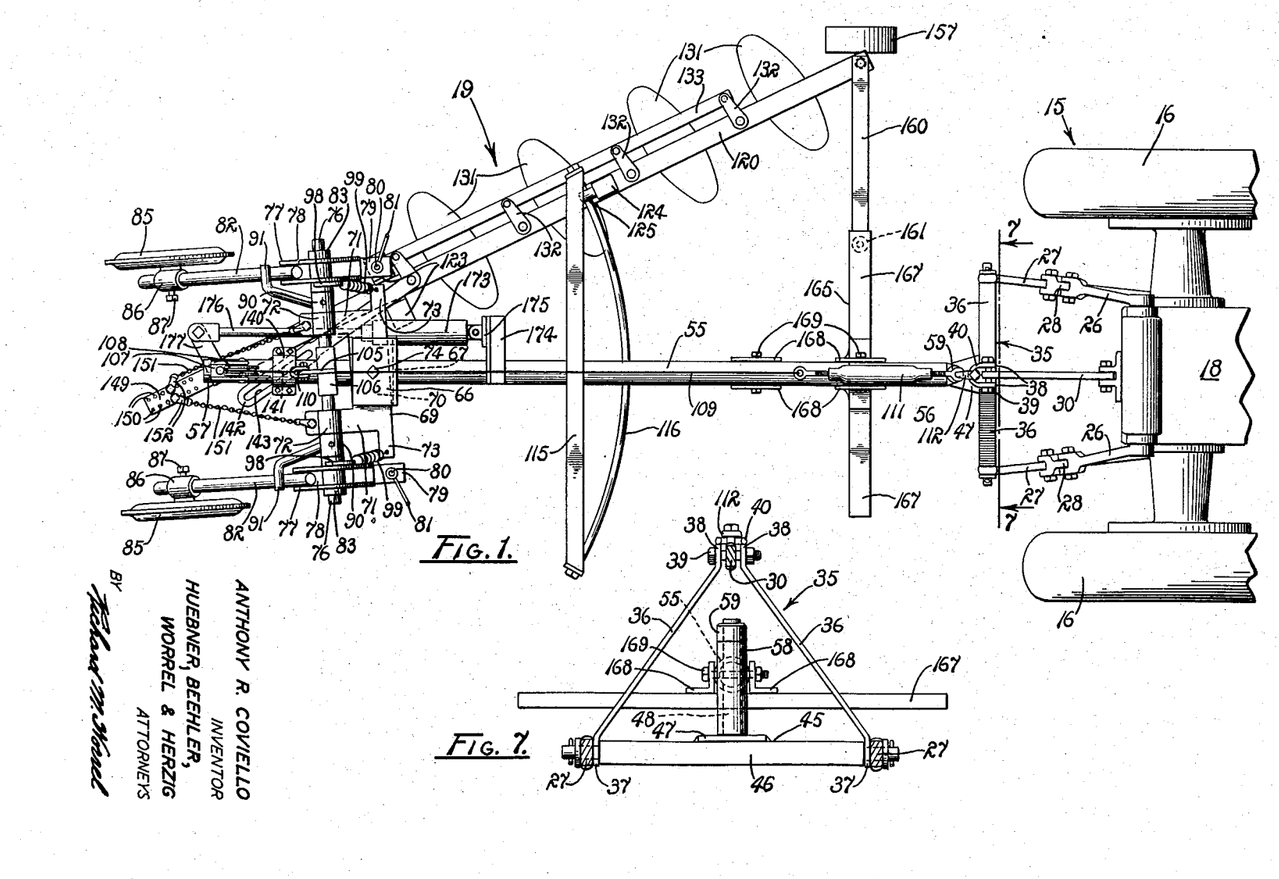
Fig. 1 is a top plan view of a reversible plow embodying the principles of the present invention, adjusted so as to discharge encountered earth laterally to the left of a line of draft and shown connected to a tractor which is fragmentarily represented.
Fig. 2 is a side elevation of the reversible plow and tractor of Fig. 1 illustrating the plow blades in earth engagement and adjusted to discharge earth laterally to the left of a line of draft.
Figure 2:
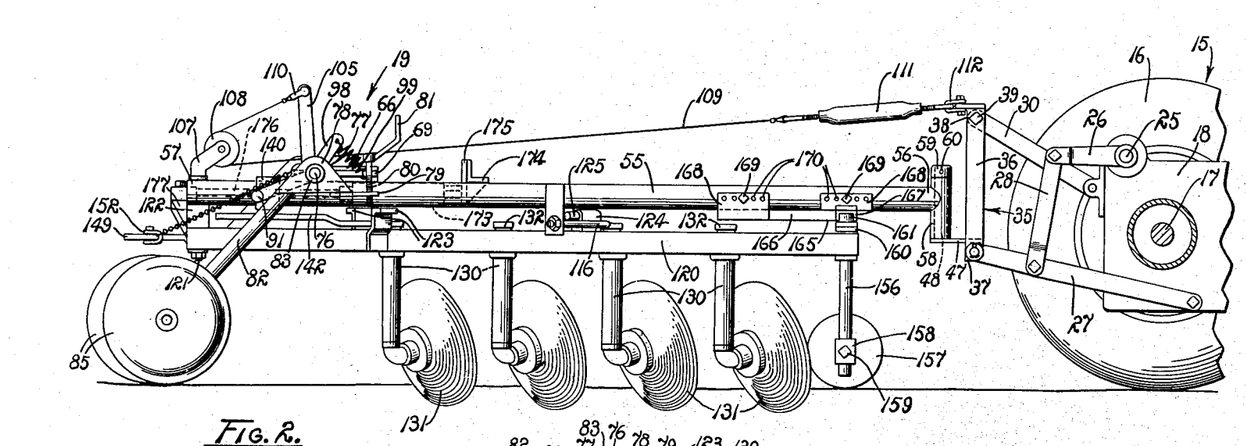
Figure 3:
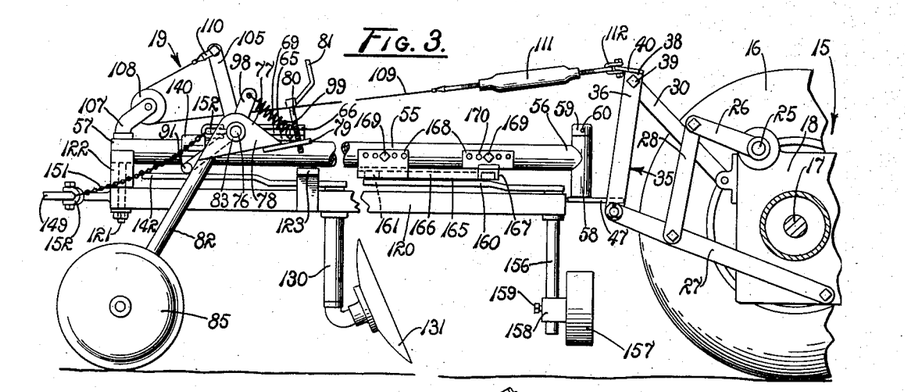
Fig. 3 is a side elevation of the reversible plow and tractor of Fig. 1 illustrating a support frame and earth working tools in an upper central position out of ground engagement and with intermediate portions broken away for illustrative convenience.

Referring more particularly to the drawings:

A tractor or other prime mover 15 constituting a draft means is fragmentarily shown in Figs. 1 to 3 as having a pair of rear drive wheels 16, a rear axle 17 and a power transmission unit 18. A reversible plow, generally indicated by the numeral 19 and embodying the principles of this invention, is connected to the tractor. A control shaft 25, of well known form, is rotatably mounted transversely of the tractor 15 on the transmission unit 18. Radius arms 26 are rigidly connected at opposite ends of the shaft and extend rearwardly therefrom. A pair of lift arms 27 are pivotally connected to the transmission unit and likewise extend rearwardly. Elevator rods 28 are provided and pivotally interconnect the radius arms and the lift arms. In addition, an upper link 29 is pivotally connected to the power transmission unit intermediate the radius arms for extension rearwardly thereof.

A substantially erect A-frame 35 provides downwardly divergent side arms 36 having lower lugs 37 pivotally connected to the rearwardly extended lift arms 27. The A-frame also provides closely spaced upper lugs 38 constituting an apex portion having a threaded pivot bolt 39 extended therebetween and on which is threaded a nut. A rearwardly disposed U-bolt 40 is rigidly secured to the upper lugs for a purpose soon to be apparent. A hand control, not shown, on the tractor 15 is employed for rotating the shaft 25 elevationally to adjust the A-frame in a manner believed well known in the art.

A coupling member 45 including an elongated central bar portion 46 has endwardly extended pintles extended through the lower lugs 37 of the A-frame 35 and the lift arms 27 and journalled therein for pivotal movement around a substantially horizontal axis. Cotter pins extend through the pintles and washers are provided on the pintles between the lift arms and the cotter pins. The coupling member also provides a rearwardly extended mounting plate 47 mounting a vertically disposed pivot spindle 48 thereon which constitutes a vertical pivot axis.

The reversible plow 19 provides an elongated substantially cylindrical frame beam 55 having a forward end portion 56, a rearward end portion 57 and opposite sides, the latter being referred to for subsequent descriptive convenience. A substantially vertically disposed pivot sleeve 58 is rigidly secured at the forward end of the beam and is rotatably fitted on the pivot spindle 48. For this purpose a collar 59 is positioned on the spindle above the sleeve and a pin 60 extended therethrough to enable dependable releasable association of these elements. The frame is thus coupled for forward movement in a predetermined line of travel behind the tractor 15 and is adapted for vertical and horizontal pivotal movement relative to the tractor.

Figures 8, 9:
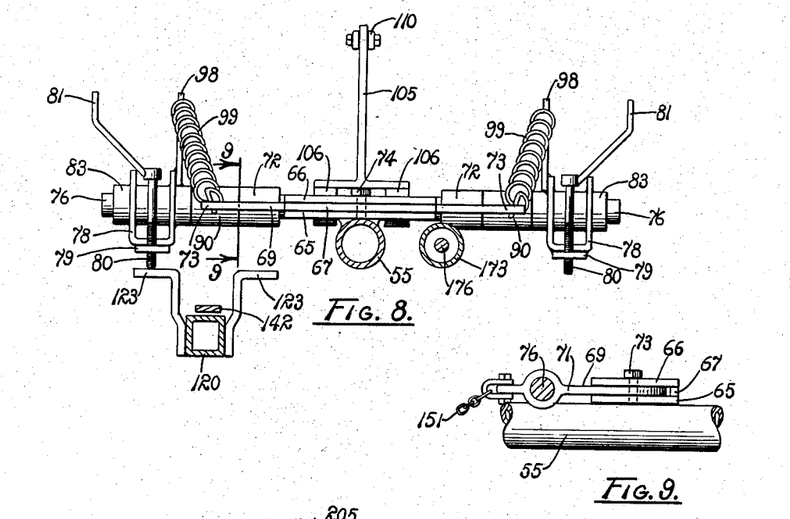
Fig. 8 is a somewhat enlarged vertical section looking rearwardly of the plow and taken on line 8—8 of Fig. 4.
Fig. 9 is a fragmentary transverse section taken on line 9—9 of Fig. 8.

Referring in particular to Figs. 1, 8 and 9, it will be noted that a substantially flat lower bearing plate 65 is welded, or otherwise rigidly secured, at the rearward end 57 of the frame beam 55. An upper bearing plate 66 is mounted above the lower bearing plate in spaced substantially parallel relation thereto by an elongated spacer member 67 weldably secured between the upper and lower bearing plates at the forward edges thereof. A guide wheel mounting bracket 69 provides a central portion 70 slidably fitted between the upper and lower bearing plates; a pair of lateral rearwardly extended arms 71 having transverse axially aligned bearing sleeves 72 at the rearward ends thereof, and wings 73 substantially perpendicularly extended outwardly from the arms. A vertically disposed pivot bolt 74 is extended through the bearing plates and the central portion of the guide wheel bracket thereby mounting the bracket on the frame beam for horizontal pivotal movement around a substantially vertical axis.

An elongated substantially horizontally disposed shaft 76 having opposite ends is rotatably journaled in the bearing sleeve 72 thereby being in a transverse position relative to the frame beam 55. Legs 78 provide central bearing brackets 78 journaled on opposite ends of the shaft for free and independent vertical pivoting movement of the legs relative thereto. The legs have forwardly extended portions 79 through which are screw-threaded stop bolts 80 providing upwardly disposed crank handles 81. In addition, the legs have elongated rearwardly and downwardly extended portions 82 rigidly secured to the central bearing brackets. Collars 83 are secured on the shaft outwardly of the leg bearing brackets for preventing outward axial movement of the legs on the shaft.

A pair of laterally spaced guide wheels 85 provide sleeves 86 slidably fitted on the rearwardly extended portions of the legs 77. Adjusting bolts 87 are extended through the sleeves for engagement with the legs to fix the position of the wheels relative to the legs at selected positions. It is noted that the wheels are disposed in substantially parallel relation to each other.

Cylindrical mounting members 90 are keyed, bolted or otherwise rigidly secured to the shaft 76 inwardly of the legs 77. Control arms 91 are connected to the mounting members and extend rearwardly and thence laterally therefrom for engagement with the rearwardly extended portions 82 of the legs.

Links 98 are rigidly secured to the central bearing brackets 78 of the legs 77 and are upwardly extended therefrom. Tensioned coil springs 99 interconnect the wings 73 of the guide wheel bracket 69 and the links 98 on corresponding sides of the frame beam 55 for limiting excessive counterclockwise pivoting of the legs 77, as viewed in Fig. 2.

A control lever 105 is rigidly connected by means of a bracket 106 to the shaft 76 intermediate the bearing sleeves 72 and is upwardly radially extended in angular relation to the control arms 91. A bracket 107 is pivotally mounted at the rearward end 56 of the beam 55 and rotatably mounts a pulley 108 thereon for rotation about a substantially horizontal axis. An elongated flexible control cable 109 has a rearward end connected by means of a clevis 110 to the control lever and is threaded around the pulley and has a forwardly extended end connected to a turnbuckle 111. A forward clevis 112 interconnects the turnbuckle and the U-bolt 40 on the upper lugs 38 of the A-frame 35 so that raising and lowering movement of the A-frame acts alternately to tension and slacken the cable, respectively.

Figure 4:
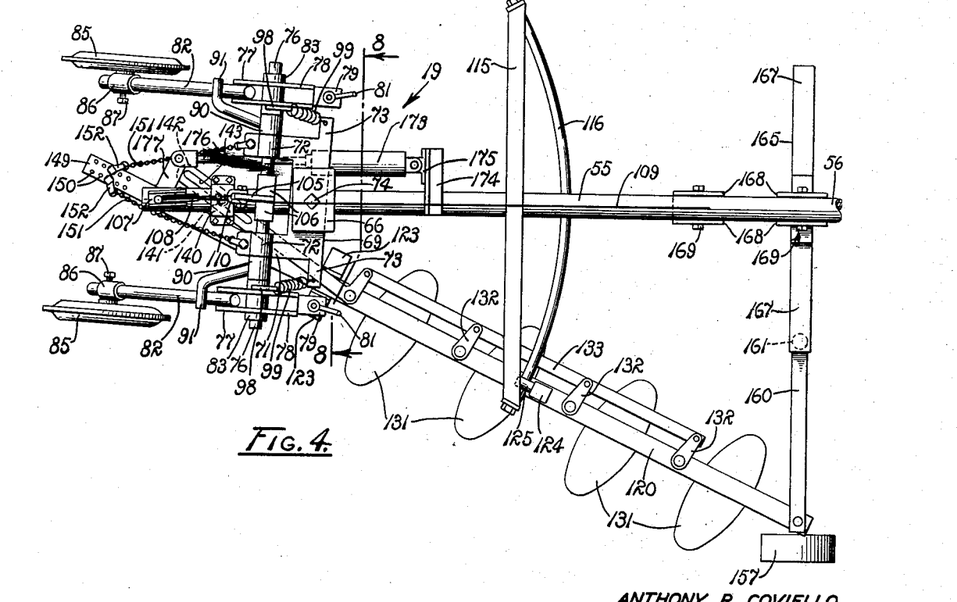
Fig. 4 is a top plan view of the reversible plow of Fig. 1 reduced in size and adjusted to discharge encountered earth laterally to the right of a line of draft.

Referring in particular to Figs. 1 and 4, an elongated transverse strut 115 is secured, as by welding, to the frame beam 55 intermediate the forward and rearward end portions 56 and 57. The strut provides opposite ends interconnected by an arcuate track 116 concentric to a position adjacent to the rearward end of the beam and having a substantially cylindrical cross section.

A plow beam 120 providing forward and rearward ends is pivotally mounted on the frame 55 by means of a vertically disposed spindle 121 concentric to the track 116 and mounted on the rearward end of the frame rotatably received in a vertically disposed sleeve 122 rigidly connected to the rearward end of the plow beam. The beam is provided with a pair of oppositely laterally extended stop brackets 123. A mounting bracket 124 is connected to the beam centrally thereof and mounts a roller 125 on a substantially horizontal axis for engagement with the arcuate track 116, as best seen in Figs. 1, 2 and 4. It is to be noted that the beam is disposed in vertically spaced relation beneath the frame beam 55 so that during pivotal movement of the beam, the stop brackets are permitted to move beneath the frame beam to positions beneath the forwardly extended portions 79 of the legs 77, both positions being observable by reference to Figs. 1 and 4.

A plurality of tool posts 130 are rotatably mounted in the beam 120 in substantially equally spaced relation and downwardly extended therefrom. A plow disc blade 131 is rotatably mounted on a lower end of each post in earth engaging attitude. Plow control arms 132 are radially extended from the tool posts above the beam and a rigid push-pull bar 133 is pivotally connected between the radially extended ends of the control arms. The arms and their connection to the push-pull bar are such that the tool posts and their disc blades are constrained to substantially uniform rotational positioning in the beam.

Figure 5:
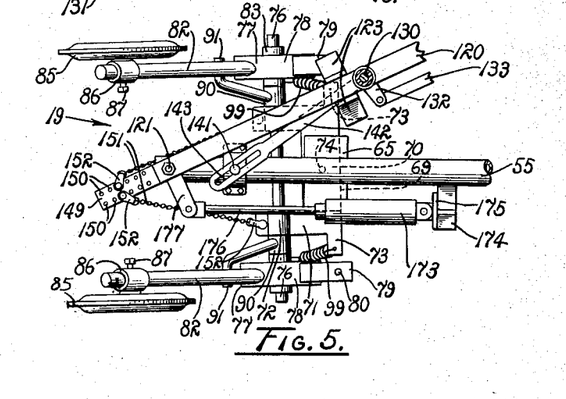
Fig. 5 is a fragmentary bottom plan view of the reversible plow as seen in Fig. 4.
Figure 6:
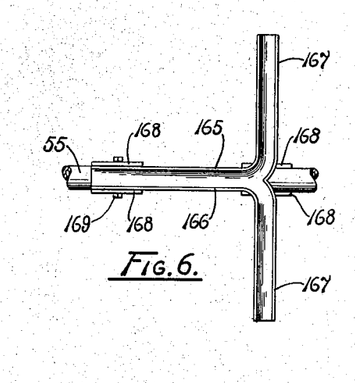
Fig. 6 is a fragmentary view of a guide track mounted on the support frame for the plow as employed in the present invention.

A clamp sleeve 140 is mounted on the rearward end 57 of the frame beam 55 forwardly of the pivot spindle 121 for the plow beam 120 for adjustable slidable movement therealong. As best seen in Fig. 5, a downwardly extended cam following guide pin 141 is secured to the clamp sleeve. A plow positioning arm 142 has a longitudinally extended slot or camway 143 therein fitted over the guide pin and provides a forwardly extended end rigidly connected to the rearwardmost plow control arm 132.

The plow beam 120 is provided at its rearward end with a plate 149 having a pair of rows of apertures 150. A pair of chains 151, or other flexible linkage members, are individually connected by means of clevises 152 between the rearwardly extended arms 71 of the guide wheel mounting bracket 69 and the apertures in the plate on the beam.

Referring now to Figs. 1, 2, 3 and 4, a substantially vertically disposed shaft 156 is seen rotatably mounted in the forward end of the plow beam 120. A beam support wheel 157 provides a slide block 158 slidably mounted on the shaft and adjustably fixed thereto by a bolt 159. A wheel positioning arm 160 is rigidly connected at an outer end to the vertically disposed shaft and provides a roller 161 at an inner end thereof.

A substantially T-shaped guide track 165 is mounted beneath the frame beam 55 at the forward end portion thereof for receiving the roller 161 and for guiding movement of the wheel positioning arm 160. The guide track provides a longitudinally extended inverted channel shaped central section 166 and a pair of laterally extended inverted channel-shaped sections 167 individually arcuately connected to the central section to guide movement of the roller riding in either lateral section, and being pulled toward the center, into the central section before entry into the other lateral section. Pairs of parallel mounting plates 168 are connected to the guide track and extended upwardly therefrom on opposite sides of the frame beam. Bolts 169 are extended through selected holes 170 in the plates and into the beam for adjustably positioning the track longitudinally of the beam.

An hydraulic ram 173 is pivotally connected at one end to a mounting bracket 174 rigidly connected to the beam 55 and having a vertically disposed mounting plate 175 and is rearwardly extended therefrom. The ram provides a piston rod 176 pivotally connected to a link 177 rigidly laterally extended from the rearward end of the plow beam 120.

Second form

Figure 10:
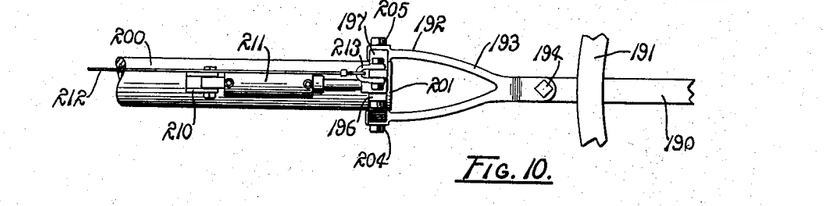
Fig. 10 is a fragmentary top plan view of a modified coupling member employed with the present invention and shown attached to a different tractor hitch from that of Figs. 1–9.
Figures 11, 12:
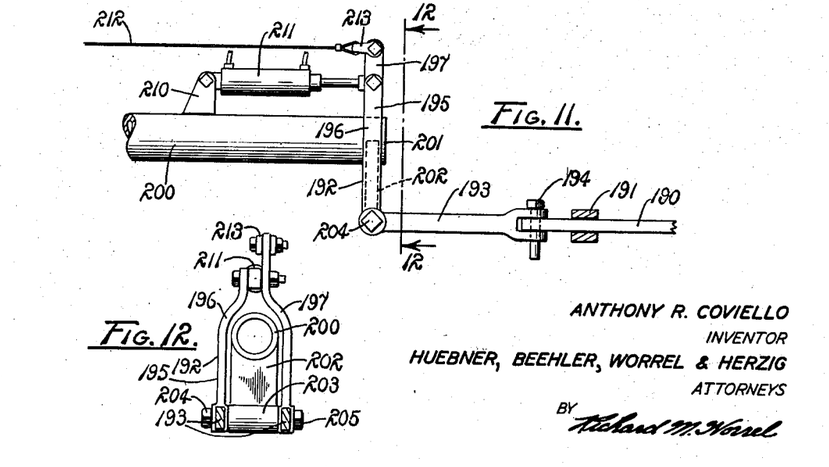
Fig. 11 is a fragmentary side elevation of the modified form of the invention shown in Fig. 10.
Fig. 12 is a vertical section looking rearwardly taken on line 12—12 of Fig. 11.

Referring to Figs. 10, 11 and 12, a draft tongue 190 is fragmentarily shown and may be adapted for connection to a tractor, not shown, or other prime mover. A pair of vertically spaced arcuate segment bars 191 are also fragmentarily shown and receive the tongue in slidable relation therebetween. A right-angular coupling member 192 provides a horizontal bifurcated portion 193 pivotally connected at a forward end by a vertically disposed pivot bolt 194 to the tongue and having a rearward end. The coupling member also has a vertically disposed bifurcated portion 195 providing a lower end rigidly connected to the rearward end of the horizontal portion and a pair of upwardly extended legs 196 and 197. It is to be noted that the leg 197 extends upwardly beyond the leg 196.

An elongated frame beam 200 similar to the frame beam 55 is fragmentarily shown in Figs. 10 and 11 and provides a forward end 201. A plate 202 is dependently rigidly secured to the forward end of the frame beam 200 and provides a horizontally disposed sleeve 203. A threaded pivot bolt 204 is extended through the lower end of the vertical portion 195 of the coupling member 192 and through the sleeve 203 and a nut 205 is threaded thereon.

A mounting bracket 210 is rigidly supported on the frame beam 200 in upwardly disposed position and a ram 211 is pivotally connected between bracket 210 and the upwardly extended legs 196 and 197 of the clevis member 192. In addition, an elongated flexible control cable 212 is connected by means of a clevis 213 to the upwardly extended leg 197.

In other respects the second form of the invention is identical with the form shown in Figs. 1 to 9. The second form is provided to enable coupling of the plow 15 to a draft connection which differs from that shown in the first form of the invention.

Operation

The operation of the illustrated embodiments of this invention described this far is believed to be readily apparent and is brefly summarized at this point. Assuming the plow 19 to be in the position shown in Fig. 3, it is placed in condition for normal plowing operation as shown in Figs. 1 and 2, in the following manner. The hydraulic ram 173 is extended by suitable hydraulic controls, not shown, thereby to pivot the plow beam 120 to an operational position at the left of the frame 55, as shown in Fig. 1. Pivotal movement of the plow beam causes the plow positioning arm 142 to pivot around a vertical axis concentric with the rearwardmost tool post 130 incident to sliding movement of the plow positioning arm on the guide pin 141. The plow blades 131 are thus rotated on their tool posts inasmuch as movement of the rearwardmost plow control arm 132 is transmitted to the other plow control arm by the push-pull bar 133. In this position the plow blades are angled to discharge encountered earth to the left of a line of draft, as seen in Fig. 1.

In pivoting the plow beam 120 from a central position, as seen in Fig. 3, to the position seen in Fig. 1, the forward beam support wheel 157 is rotated relative to the beam on the vertical shaft 156 from a position with its axis in substantially longitudinal alignment with the frame beam 55 to a position with its axis disposed transversely to the frame beam. Thus, as the plow beam moves outwardly from the frame beam, the wheel positioning arm 160 draws the roller 161 along the central section 166 of the guide track 165 and thence outwardly in the lateral section 167 of such track on the side of the frame beam toward which the plow beam is being moved. As will be evident, this rotates the vertical shaft and thus the support wheel through substantially 90° from the central position of the plow beam to its left operational position.

Movement of the plow beam 120 to the position of Fig. 1 also pivots the horizontally disposed shaft 76 at the rear of the frame 55 in a counterclockwise direction, as seen in Fig. 1, around a vertical axis as defined by the pivot bolt 74. This is accomplished by the chain 151 on the side of the frame beam 55 toward which the plow beam is being moved pulling on the corresponding rearwardly extended arm 71 of the guide wheel bracket 69, This movement of the horizontal shaft angles the guide wheels 85 to the right, as seen in Fig. 1.

The A-frame 35 is then lowered by operation of suitable means, not shown, for controlling the hydraulic lift system of the tractor 15. The coupling member 45 permits movement of the forward end 56 of the frame beam 55 around a substantially horizontal axis relative to the rearwardly disposed lift arms 27 so that as the A-frame is lowered, the forward end portion of the frame beam is also lowered.

As the A-frame is lowered, tension on the cable 109 is relieved to permit the horizontally disposed shaft 76 to rotate in the bearing sleeve 72 around its own longitudinal axis in a clockwise direction, as seen in Fig. 3. Inasmuch as the control arms 91 are rigidly connected to this shaft, this relieves the downward pressures on the legs 77 thereby lowering the rearward end 56 of the frame beam 55 relative to the rear guide wheels 85. The frame beam is lowered until the stop bolt 80 of the leg on the side of the frame beam on which the plow beam 120 is located engages the stop bracket 123 therebelow. The crank handle 81 may be adjusted to raise or lower the frame beam on the guide wheels as desired.

When the plow 19 has been positioned in the manner described and as shown in Figs. 1 and 2, it is ready for normal plowing operation. The tractor 15 is driven forwardly and thus imparts earth traversing movement to the plow along a predetermined line of travel. The plow blades 131 engage the earth and discharge it laterally to the left of the line of draft, as seen in Figure 1. As is known, this creates a side thrust on the frame beam 55 to the right, that is, in a direction opposite to the direction in which the encountered earth is discharged. The guide wheels 85, however, counteract the side thrust set up by the plow blades inasmuch as they are angled to the right and tend to resist movement of the rearward end portion 56 of the frame toward the right, as viewed in Fig. 1.

It is to be noted that the rear guide wheel 85 on the opposite side of the frame beam 55 from that on which the plow beam 120 is positioned offers little supporting effect because of its being freed for floating movement by removal of its stop bracket 123 to the opposite side of the frame beam with the plow beam. During movement of such guide wheels in valleys or depressions in terrain traversed, the spring 99 associated therewith precludes excessive pivotal movement of the wheels on the horizontal shaft 76 in a counterclockwise direction, as viewed in Fig. 2. Thus, the possibility of the wheel folding under the frame is avoided. In addition, since the guide wheels employed are of considerable weight, the springs tend to impose such weight on the frame and thereby help to keep the plow blades 131 in the ground in traversing unusually hard terrain.

As the plow blades 131 dig through encountered earth, the forward support wheel 157 rides in rolling engagement on the surface of the ground. It is significant to note that this support wheel precludes excessive digging of the forwardmost plow blades 131 into the ground and tends to maintain the plow beam 120 in a substantially horizontally disposed position.

When it is desired to change the position of the plow beam 120 from one side of the frame 55 to the other, as from the position of Fig. 1 to the position of Fig. 4, the A-frame 35 is elevated by operation of the hydraulic lift control, not shown. When the plow blades 131 are out of engagement with the earth, the hydraulic ram 175 is retracted thereby to pivot the plow beam in a clockwise direction, as viewed in Fig. 1, under the frame beam 55 to the opposite side thereof until the corresponding stop bracket 123 is under the stop bolt 80 on the side of the frame toward which the plow beam moves. It is believed understood that during such movement, the roller 125 mounted on the plow beam rolls on the arcuate track 116 to maintain the plow beam in supported relation on the frame.

This pivotal movement of the plow beam 120 causes the beam support wheel positioning arm 160 to urge the roller 161 along the left lateral section 167 of the guide track 165, into the central section 166 and out the right lateral section. This rotates the vertical shaft 156 and thereby the beam support wheel 157 through substantially 180° from the position shown in Fig. 1 to the position shown in Fig. 4. The support wheel is thus adapted to turn on a concentric axis transversely disposed to the line of draft of the frame whether on one side of the frame or the other.

Also, pivotal movement of the plow beam 120 from the left side of the frame beam 55 to the right pulls on the chain 151 on the side toward which the beam is moving to pivot the horizontally disposed shaft 76 in a clockwise direction, as seen in Fig. 1, around a vertical axis defined by the pivot bolt 73. This angles the rear guide wheels 85 toward the left, as in Fig. 4.

The A-frame 35 is then again lowered and as the plow 19 is operated, the plow blades 131 discharge encountered earth laterally to the right of a line of draft and set up a side thrust toward the left. This thrust is counteracted by the guide wheels 85 which are now angled in the opposite direction and tend to resist turning of the rearward end portion 57 of the frame beam 55 toward the left.

When it is desired to transport the plow from one place to another, the A-frame 35 is raised thereby raising the forward end 56 of the frame beam 55. The ram 175 is then retracted or extended, as the case may be, to pivot the plow beam 120 to the center or in vertical alignment with the frame beam 55. This brings the rear guide wheels 85 into positions of alignment with a forward direction of movement so that the guide wheels turn about aligned horizontal axes transversely of the frame beam.

As the A-frame 35 is elevated, the apex portion of the frame pulls on the cable 109 thereby to rotate the horizontal shaft 76 through the central lever 105 in a substantially counterclockwise direction, as viewed in Fig. 2. This thrusts the control arms 91 downwardly against the rearwardly extended portions 82 of the legs 77 thereby raising the frame beam 55 relative to the rear guide wheels 85. Thus both the frame beam 55 and plow beam 120 are elevated into a substantially horizontal position on the draft mechanism, that is, the lift arms 27 associated with the tractor 15, and the rear guide wheels 85. This position is shown in Fig. 3. The tractor may be driven along a highway or the like towing the plow behind. Turns are easily negotiated inasmuch as vertical pivotal movement is permitted between the tractor and the frame by the coupling member 45. It will be understood that this coupling member is also effective to facilitate turns during plowing operations.

The second form of the invention operates in substantially the same manner as the first form above described with the exception of the raising and lowering of the frame. Referring to Figs. 10, 11 and 12, the forward end of the frame beam 200 is elevated by extending the ram 211 to pivot the coupling member 192 around a substantially horizontal axis relative to the tongue 190. This is facilitated by providing loose connection between the horizontal portion 193 of the coupling member and the tongue. This places tension on the cable 213 to elevate the rearward portion, not shown, of the frame beam in the same manner as that described in relation to the first form of the invention. The frame beam is lowered by retracting the ram in a manner believed evident. Turns are readily negotiated inasmuch as relative pivotal movement around a vertical axis is provided between the tongue and the coupling member as defined by the pivot bolt 194.

*Third form*

The third form of the present invention is shown in Figs. 13 to 19. Inasmuch as several of the component parts of the third form of the invention are identical in structure and function to parts already discussed in relation to the first and second forms of the invention, only brief mention of these similar parts will be made at this point.

Thus, an elongated cylindrical frame 250 is provided having a forward end portion 251, a rearward end portion 252 and opposite sides. Although not shown, the frame is adapted to be connected to a draft means, such as tractor 15, whereby the frame may be drawn over the ground in a predetermined forward direction of movement.

A bearing plate 255 at the rearward end portion of the frame 250 mounts a guide wheel positioning bracket 256 for pivotal movement around a substantially vertical axis. A horizontally disposed shaft 257 is rotatably mounted in the guide wheel positioning bracket. Legs 258 are pivotally mounted on opposite ends of the shaft and provide central brackets 259, forwardly extended portions having stop bolts 260 threadably extended therethrough and rearwardly downwardly extended portions 261. Cranks 262 are attached to the stop bolts for threading the bolts through the forwardly extended portions. Ground engaging guide wheels 263 are mounted on the rearwardly extended portions of the legs for rotation thereon to form a dolly.

Figures 14, 16, 17, 18, 19:
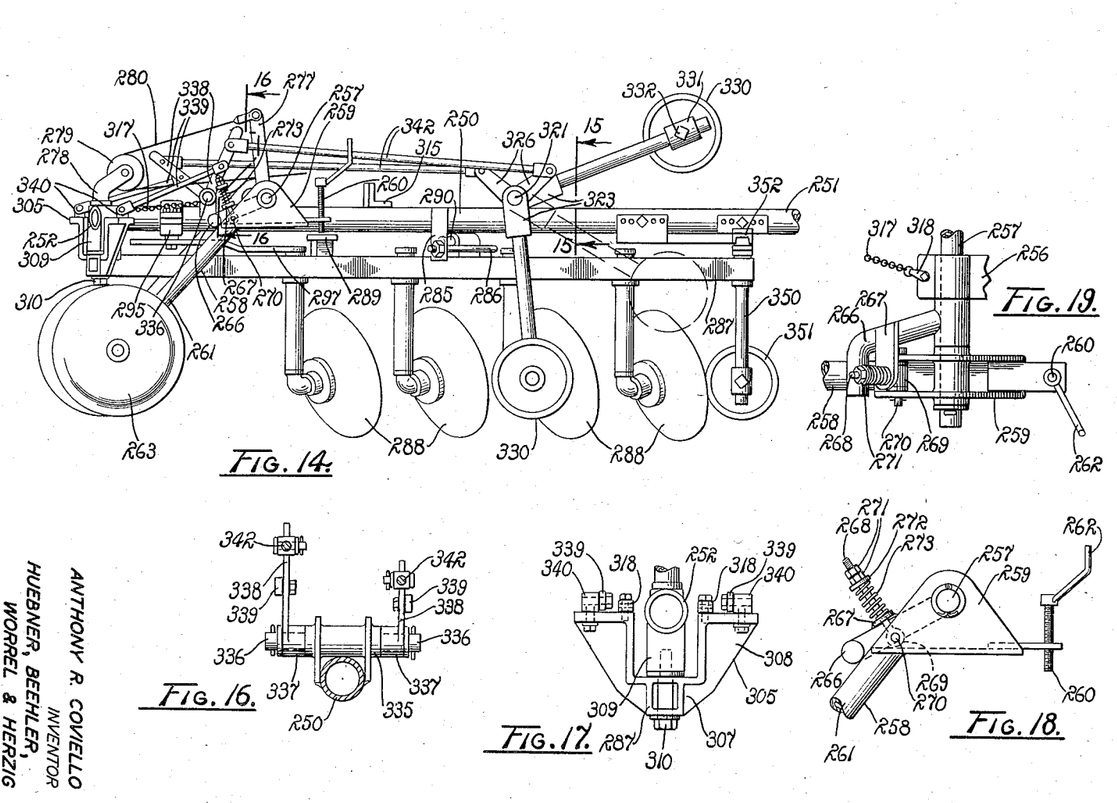
Fig. 14 is a fragmentary side elevation of the plow of Fig. 13.
Fig. 16 is a somewhat enlarged transverse section taken on line 16—16 of Fig. 14.
Fig. 17 is a somewhat enlarged fragmentary rear elevation of a tail bracket employed with the form of the invention shown in Figs. 13 and 14.
Fig. 18 is a somewhat enlarged fragmentary side elevation of a portion of the invention shown in Figs. 13 and 14.
Fig. 19 is a fragmentary top view of the portion of the invention shown in Fig. 18.

Control arms 266 are rigidly connected to the shaft 257 on opposite sides of the frame 250 and rearwardly extended therefrom above the legs 258. Plates 267 are connected to the control arms and extend laterally outwardly thereof over the central brackets 259. Bolts 268 provide collars 269 pivotally connected to the central brackets by pins 270 extended through the brackets, as best seen in Figs. 18 and 19. The bolts are upwardly slidably extended through the plates 267 and lock nuts 271 are threadably connected to the bolts on the opposite ends thereof from the collars. Stop members 272 are provided on the bolts adjacent to the nuts and coil springs 273 are connected around the bolts intermediate the stop members and the plates 267.

A control lever 277 is centrally upwardly extended from the shaft 257, as before. A support bracket 278 is rotatably mounted on the rearward end 252 of the frame 250 for pivotal movement around a substantially vertical axis and mounts a pulley 279 thereon. An elongated flexible control member 280, such as a cable, is connected at one end thereof to the control lever, is extended around the pulley and forwardly extended for attachment to an A-frame, not shown, or the like draft means on the prime mover, as described in connection with the first and second forms of the invention.

An elongated transverse strut 285 is secured to the frame beam 250 intermediate the forward and rearward ends 251 and 252 thereof and provides opposite ends. An arcuate track 286 interconnects the opposite ends of the strut and is concentric to a position adjacent to the rearward end of the beam as will be well understood. A plow beam 287 providing forward and rearward ends is identical to that previously described and thus it is only noted at this point that the plow beam mounts a plurality of earth engaging tools 288. The plow beam provides stop brackets 289 rearwardly thereon and a roller 290 engageable with the arcuate track 286.

A slide block or sleeve 295 is mounted for slidable movement on the rearward end 252 of the frame 250 and provides a camming pin 296 downwardly extended therefrom. A plow positioning arm 297 is controllably connected to the tools 288 on the plow beam 287 and provides an elongated longitudal slot 298 slidably fitted over the pin 296.

Referring in particular to Fig. 17, a substantially U-shaped upright tail bracket 305 provides a recessed central portion 307 rigidly connected to the rearward end of the plow beam 287 and a pair of upwardly extended arms 308. The rearward end 252 of the frame 250 is pivotally supported in the recessed portion of the tail bracket on a support block 309 which is pivotally connected to the plow beam by means of a pivot bolt 310 upwardly extended through the plow beam into the support block. The plow beam is therefore mounted in the frame for horizontal pivotal movement between opposite operational positions, one of which is shown in Fig. 13, on opposite sides of the frame 250.

A bracket 315 is mounted transversely on the frame 250 intermediate the forward and rearward ends thereof and a ram 316 provides a forward end pivotally connected to the bracket 315 and a rearward end pivotally connected to one arm 308 of the tail bracket 305. When the ram is extended, the plow beam 287 is pivoted to a left position, as viewed in Fig. 13 and as would be viewed from a position looking in the direction of movement of the frame. When the ram is retracted, the plow beam is pivoted to a position on the right of the frame, as viewed in Fig. 13. A pair of chains 317 having clevises 318 interconnect the arms 308 of the tail bracket 305 with the guide wheel positioning bracket 256 on opposite sides of the frame 250. In this regard the chains form a similar function to the chains 151 in the first form of the invention. Thus, as the plow beam 287 is moved from one side of the frame to the other, the shaft 257 is pivoted to angle the guide wheels 263 in such an attitude as to offset the thrust set up by the tools 287 when in earth engagement.

Figures 13, 15:
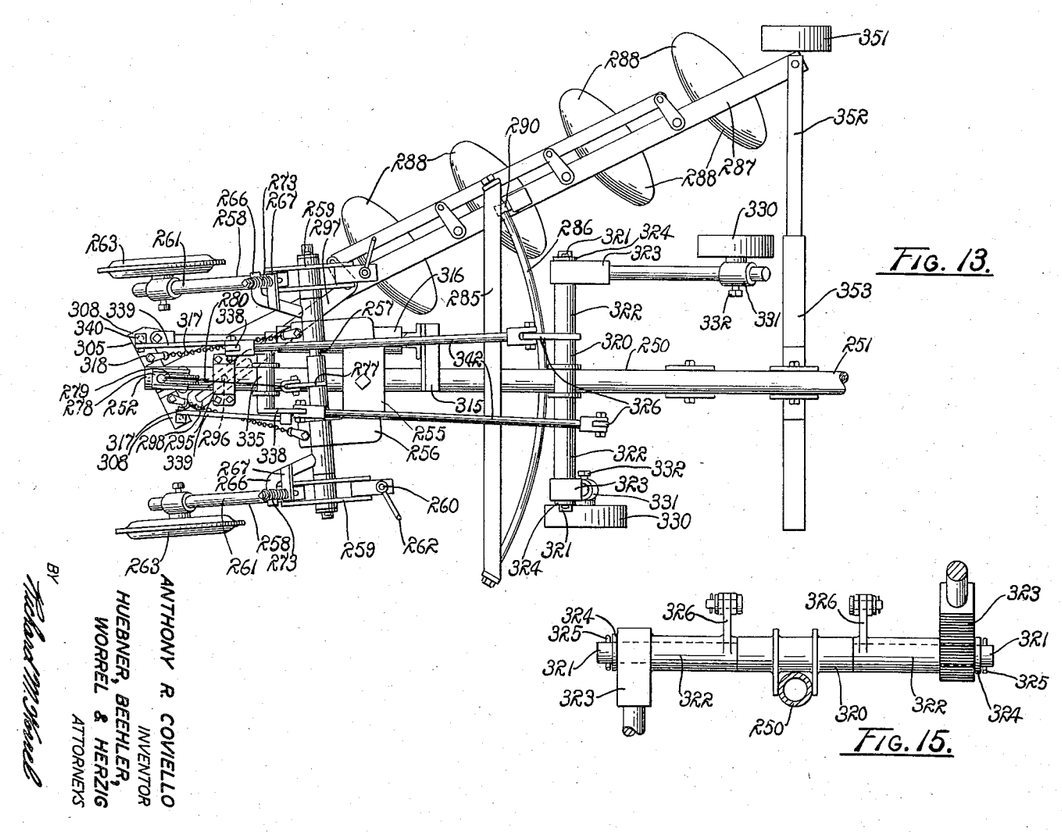
Fig. 13 is a fragmentary top plan view of a reversible plow showing another form of the present invention.
Fig. 15 is a somewhat enlarged fragmentary cross section taken on line 15—15 of Fig. 14.

Referring to Fig. 15 a forward support bracket 320 is secured, as by welding, to the frame 250 forwardly of the arcuate track 286 and provides shafts 321 oppositely laterally extended therefrom. Sleeves 322 are rotatably mounted on the shafts, and legs 323 are rigidly radially extended from the sleeve. Washers 324 are fitted on the shafts outwardly of the legs and cotter pins 325 are extended through the shafts for maintaining the legs and sleeves thereon. Individual control levers 326 are radially generally upwardly extended from the sleeves.

Auxiliary ground engaging support wheels 330 are rotatably mounted on sleeves 331 which are slidably fitted to the legs 323 and adjustably positioned thereon by lock bolts 332 extended through the sleeves and for engagement with the legs.

A rearward journal barcket 335 is mounted on the frame 250 adjacent to the rearward end 252 thereof and intermediate the guide wheel positioning bracket 256 and the slide block 295. Stub shafts 336 are oppositely laterally extended from the journal bracket, sleeves 337 are journaled on the shafts, and control arms 338 are rigidly generally upwardly extended from the sleeves. The control arms are displaced from each other in substantially right-angular relation, as best seen in Fig. 14. Further, the control arms provide a plurality of apertures 339 therein. Rigid control bars 339 provide rearward ends pivotally connected by means of mounting members 340 to the arms 308 of the tail bracket 305 for pivotal movement around substantially horizontal axes and forward ends pivotally connected to the control arms 338. Elongated rigid control rods 342 provide rearward ends pivotally connected in the upper apertures of the control arms and forward ends pivotally connected to the control levers 326.

A substantially vertically disposed shaft 350 is journaled in the forward end of the plow beam 287, as before. A main support wheel 351 is adjustably slidably mounted for rotation around a substantially horizontal axis on the shaft. A wheel positioning arm 352 is rigidly extended from the shaft for guidably rotating the shaft in the plow beam in response to movements of the arm in a guide track 353 mounted on the frame 250. This structure has already been described in connection with the first form of the invention.

*Operation of third form*

No further description is made of the general overall operation of the plow inasmuch as it is in substance the same as that which has been described in relation to the first and second forms of the invention.

The third form of the invention is designed primarily for use in situations where insufficient support is given to the opposite side of the frame 250 from the side on which the plow beam 287 is working. Through experience it has been found that certain draft hitches in use do not hold the frame and plow beam level and therefore additional support is required to avoid sagging of opposite sides of the frame. For this reason if the plow beam is on the left side of the frame, as shown in Fig. 13, the right auxiliary support wheel 330 is downwardly extended in ground engagement, as also shown in Fig. 13. At this time, the left auxiliary support wheel is forwardly upwardly extended out of ground engagement.

When the plow beam 287 is pivoted to the opposite side of the frame 250, that is to the right side of the frame as viewed in Fig. 13, the tail bracket 305 pivots in a clockwise direction to pivot the left auxiliary support wheel 330 into a downward ground engaging position and to pivot the right auxiliary support wheel upwardly forwardly out of ground engagement. More specifically, clockwise pivotal movement of the tail bracket pushes the left control bar 339 forwardly thereby to push the left control arm 338 forwardly, the left control rod 342 forwardly, and the left control lever 326 forwardly thereby to rotate the sleeve 322 in a clockwise direction, as viewed in Fig. 14, to lower the auxiliary support wheel associated therewith. The reverse operation takes place to elevate the right auxiliary support wheel. The linkage system including the control levers 326, control rods 342, control arms 338, and control bars 339 is such that the plow beam 287 in moving toward center moves beneath the left leg 323 before such left leg is lowered sufficiently to engage the plow beam. Further, by the time the plow beam 287 has advanced beyond center toward its right operational position, the linkage system, as above noted, has moved the right leg and wheel 330 upwardly out of the path of the plow beam. Again the reverse is true when pivoting the plow beam in a counterclockwise direction. In this manner there is no interference between the movements of the legs and auxiliary support wheels with the movements of the plow beam. It will be evident that in accomplishing this objective the linkage system maintains the legs 323 in substantially right angular relation. This angle may be slightly greater than ninety degrees as illustrated and in any event is to be adjusted to prevent the interference noted.

From the foregoing it will be evident that the auxiliary support wheel 330 on the opposite side of the frame 250 from the operational position of the plow beam 287 is in ground engagement to provide support for the implement on the opposite side of the frame from the plow beam. In this manner the frame and plow beam are maintained in a substantially horizontal level attitude by the main support wheel 351 and the operative auxiliary support wheel.

In addition, the third form of the invention provides for elevational floating movement of the rearward support legs 258. As before, the control arms 266 are made to bear downwardly on the legs by forward tension on the control cable 280 thereby to elevate the frame 250 on the rear guide wheels 263. Whenever a rear guide wheel traverses a depression in the earth, the weight of the wheel 263 tends to move the legs downwardly with respect to the frame as the wheel maintains ground engagement. When a leg is depressed in this manner its bolt 268 slides downwardly through the plate 267 and compresses the spring 273 between the stop member 272 and the plate 267. This not only cushions downward movement of the legs and the wheels but also provides a positive limit to such downward movement. This of course occurs when the stop members engage the plates. The engagement of the stop members with the plates also functions to prevent the wheels from pivoting on the shaft 257 forwardly under the frame, previously referred to as folding of the wheels under the frame.

From the foregoing it will be evident that the support vehicle of the present invention automatically counteracts side thrust setup by the plow blades in both of their operational positions, prevents excessive digging or undue raising of the blades when plowing, enables elevational as well as horizontal adjustment of the plow blades for operation or transportation, enables balanced support of the implement in either operational position of the plow beam, permits attachment to draft hitches of well known form and is in general a highly effective apparatus for supporting agricultural implements and the like.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent structures and devices.

Having described my invention, what I claim as new and desire to secure by Letters Patent is:

1. An agricultural implement comprising a frame, a tool support beam pivotally mounted in the frame for horizontal pivotal movement and having oppositely extended ends, a substantially vertically disposed shaft rotatably mounted adjacent to one end of the beam, a support wheel rotatably mounted on the shaft, a support wheel positioning arm extended from the shaft, means mounted on the frame engaging the arm for rotating the shaft incident to beam movement, a substantially horizontally disposed shaft rotatably mounted transversely on the frame for horizontal pivotal movement, legs journalled on the substantially horizontally disposed shaft, guide wheels rotatably mounted on the legs, control arms rigidly connected to the horizontal shaft and extended for engagement with the legs, means connected to the shaft for controlled rotation thereof, and means connecting the shaft with the end of the beam opposite to the end mounting the vertical shaft for pivoting the horizontal shaft incident to beam movement.

2. An agricultural implement comprising a frame adapted for earth traversing movement, an elongated tool support beam pivotally connected to the frame for horizontal pivotal movement thereon in opposite directions around an upright pivot axis between opposite operational positions in the frame, a wheel positioning bracket pivotally connected to the frame having transversely extended portions and being pivotal around an upright pivot axis between oppositely angled positions relative to the frame, laterally spaced guide wheels mounted on the extended portions of the bracket on opposite sides of its pivotal connection to the frame, and linkage means interconnecting the extended portions of the bracket and the beam for pivoting the bracket incident to pivotal movement of the beam in the same direction of rotation around the bracket pivot axis as the beam moves around the beam pivot axis.

3. An agricultural implement comprising an elongated frame having forward and rearward ends and opposite sides adapted for earth traversing movement along a predetermined line of travel, an earthworking tool support beam pivotally mounted on the frame for horizontal swinging movement relative to the frame around a substantially vertical axis and having ends oppositely extended from its pivotal connection to the frame, a tool dependent from the beam adapted for earth engagement whereupon side thrusts are imposed on the frame, a guide wheel positioning bracket pivotally mounted on the frame in spaced relation to the pivotal connection of the beam with the frame for horizontal movement around a substantially vertical axis and having arms laterally extended from its pivotal connection to the frame, the pivot axes of the beam and bracket being substantially aligned longitudinally of the frame, guide wheels disposed on opposite sides of the frame, means mounting the wheels on the arms of the bracket, and tension means interconnecting the arms of the bracket with the end of the beam on the opposite side of the pivotal connection of the beam to the frame from the pivotal connection of the bracket to the frame for pivotal movement of the bracket incident to beam movement in the same direction as the beam whereby the guide wheels are angled in generally the same direction as the beam relative to the line of travel of the frame for opposing side thrusts imposed on the frame by the tool.

4. In an agricultural implement, an elongated frame having forward and rearward ends; a plow beam pivotally mounted in the frame having forward and rearward ends oppositely extended from the pivot and being horizontally movable between opposite operational positions in the frame; earthworking tools mounted on the beam having a thrust in one direction laterally of the frame when engaged with the earth with the beam in one operational position and a thrust in an opposite lateral direction relative to the frame when the beam is in its opposite operational position; a bracket having a pair of rearwardly extended laterally spaced arms pivotally mounted intermediate the arms on the frame forwardly of the plow beam pivot; a shaft extended transversly of the arms having opposite ends; legs connected at opposite ends of the shaft extended rearwardly downwardly therefrom; ground engaging guide wheels rotatably mounted on the legs; and flexible linkages interconnecting the arms of the bracket and the rearward end of the plow beam thereby to angle the bracket and the wheels incident to pivotal movement of the plow beam so that the wheels oppose the lateral thrust set up by the earthworking tools in each of said operational positions.

5. An agricultural implement comprising an elongated frame having forward and rearward ends; means supporting the rearward end of the frame for earth traversing movement; a draft connection at the forward end of the frame; an elongated plow beam having a rearward end pivotally mounted on the frame, a forwardly extended end, and being horizontally reciprocally movable between angularly spaced operational positions relative the frame; earthworking tools borne by the beam; a roller guide track secured to the forward end of the frame including a longitudinally disposed central section and a pair of transversely disposed lateral sections individually arcuately connected to the central section to constrain movement of a roller rolling in either lateral section toward the central section into the central section before moving into the other lateral section; a vertically disposed shaft journalled in the forward end of the plow beam; a substantially circular ground engaging support wheel mounted on the shaft for rotation around a substantially horizontal concentric axis; a control arm rigidly connected to the shaft and extended therefrom in a plane substantially coincident with the axis of the wheel having a roller rotatably mounted thereon and riding in the guide track thereby to pivot the shaft and wheel through substantially 180° as the plow beam moves from one operational position to the other and in each operational position is in a plane substantially parallel to the frame.

6. In an agricultural implement, an elongated frame having forward and rearward ends and opposite sides, a plow beam mounted on the frame for horizontal pivotal movement between opposite operational positions having stop bracket means thereon, a shaft having a longitudinal axis of rotation disposed transversely of the frame and providing opposite ends, means mounting the shaft on the frame for rotation around its longitudinal axis, legs rotatably mounted on opposite ends of the shaft having portions extended forwardly over the stop bracket means on the beam when the beam is at its respective side of the frame and portions rearwardly downwardly extended therefrom, ground engaging wheels mounted on the rearwardly extended portions of the legs, control arms rigidly secured to the shaft engageable with the legs, and a lever rigidly connected to the shaft for imparting rotation to the shaft and through the control arms to thrust the rearward ends of the legs downwardly to raise the frame on the wheels.

7. An agricultural implement adapted for connection to an elevationally adjustable A-frame of a tractor having a pair of downwardly divergent legs and a top apex portion comprising a coupling member pivotally connected between the legs of the A-frame for movement around a substantially horizontal axis and providing a vertically disposed spindle, a frame having forward and rearward ends and opposite sides, a vertically disposed pivot sleeve secured to the forward end of the frame and rotationally fitted on the spindle, a plow beam mounted on the frame for horizontal pivotal movement between opposite lateral positions relative to the frame, stop bracket means on the beam, a guide wheel mounting bracket connected adjacent to the rearward end of the frame including a pair of laterally rearwardly extended mounting arms having axially aligned journal bearings thereon, an elongated shaft disposed transversely of the frame rotatably mounted in the bearings, legs pivotally journalled on the shaft on opposite sides of the frame having portions forwardly extended over the stop bracket means for engagement therewith when the beam is on its respective side of the frame and portions rearwardly downwardly extended therefrom, ground engaging guide wheels rotatably mounted on the rearwardly extended portions of the legs, control arms rigidly connected to the shaft rearwardly extended in engagement with the rearwardly extended portions of the legs, a lever rigidly upwardly extended from the shaft, and means interconnecting the lever and the apex portion of the A-frame for rotating the shaft thereby to force the control arms downwardly against the legs to raise the frame on the guide wheels incident to elevational movement of the A-frame.

8. In an agricultural implement for use with an elevationally adjustable draft means, a frame having a forward end connected to the draft means for horizontal and vertical movement relative thereto and a rearward end, a tool support beam pivotally connected adjacent to the rearward end of the frame having portions forwardly and rearwardly extended from its pivotal connection and being movable between opposite lateral operational positions relative to the frame, a vertically disposed shaft rotatably mounted in the forward end of the beam, a ground engaging support wheel mounted on the shaft for rotation around a predetermined axis transversely of the frame, a support wheel positioning arm rigidly connected to the shaft, guide means on the frame engaging the arm for rotating the shaft and thereby the wheel during movement of the beam between said positions, a horizontally disposed shaft transversely mounted at the rearward end of the frame for horizontal pivotal movement and for rotation about an axis concentric thereto, legs journalled on the shaft rearwardly and downwardly extended therefrom, ground engaging guide wheels rotatably mounted on the legs, control means connected to the horizontal shaft rearwardly extended for engagement with the legs, means interconnecting the horizontal shaft and the draft means for rotating the shaft to urge the control means into engagement with the legs incident to elevational movement of the draft means, and means interconnecting the shaft and the rearwardly extended portion of the beam for angling the shaft and thereby the guide wheels incident to pivotal movement of the beam.

9. A reversible plow comprising an elongated frame having forward and rearward end portions, means for imparting longitudinal earth traversing movement to the frame, an elongated plow beam having a rearward end portion pivotally mounted in the rearward end portion of the frame and a forward end portion adjustably positionable between opposite sides of the frame, plows borne by the beam for earth engagement, a pair of legs pivotally mounted on the frame forwardly of the rearward end portion thereof for independent movement between downwardly extended positions and relatively upwardly pivoted positions, auxiliary ground engaging frame support means mounted on the extended ends of the legs, and control means individually interconnecting the plow beam and the legs oppositely pivoting the legs in response to adjustable positioning of the beam alternately to bring the auxiliary frame support means into ground engagement whereby whenever the plow beam is at a side of the frame the leg adjacent thereto is pivoted upwardly and the opposite leg is downwardly extended with its auxiliary frame support means in ground engagement.

10. A reversible plow comprising an elongated frame having forward and rearward end portions, means for imparting longitudinal earth traversing movement to the frame, an elongated plow beam having a rearward end portion pivotally mounted in the rearward end portion of the frame and a forward end portion adjustably positionable between opposite sides of the frame, plows borne by the beam for earth engagement tending to thrust the frame laterally to the side opposite that on which their beam is positioned during earth traversing movement, adjustably positioned guide means mounted in supporting relation to the rearward end portion of the frame having controlled connection to the plow beam for automatic positioning of the guide means relative to the frame to resist lateral thrust of the plows on the frame in response to adjustable positioning of the plow beam in the frame, a pair of legs pivotally mounted on the frame forwardly of the rearward end portion thereof for independent movement between downwardly extended positions and relatively upwardly pivoted positions, auxiliary ground engaging frame support means mounted on the extended ends of the legs, and control means individually interconnecting the plow beam and the legs oppositely pivoting the legs in response to adjustable positioning of the beam alternately to bring the auxiliary frame support means into ground engagement whereby whenever the plow beam is at a side of the frame the leg adjacent thereto is pivoted upwardly and the opposite leg is downwardly extended with its auxiliary frame support means in ground engagement.

11. A reversible plow comprising an elongated draft frame having forward and rearward end portions, means for coupling the forward end portion of the frame to a draft appliance for imparting earth traversing movement to the frame, an elongated plow beam having a rearward end portion pivotally mounted in the rearward end portion of the frame adjustably positionable between opposite sides of the frame, plows borne by the beam for earth engagement, a substantially horizontal shaft mounted transversely of the frame in forwardly spaced relation to the rearward end portion of said frame, a pair of sleeves independently journalled on the shaft at opposite sides of the frame, a leg rigidly connected to each sleeve and extended therefrom for independent pivotal movement of the legs on the shaft between downwardly extended positions and upwardly extended positions, an auxiliary support wheel mounted for earth engagement on the extended end of each leg, a control lever upwardly extended from each sleeve, a cross arm mounted on the rearward end portion of the beam, and a pair of push-pull linkages connected to the cross arm on opposite sides of the beam and individually connected to the control levers.

12. A reversible plow comprising an elongated draft frame having forward and rearward end portions, means for coupling the forward end portion of the frame to a draft appliance for imparting earth traversing movement to the fame, an elongated plow beam having a rearward end portion pivotally mounted in the rearward end portion of the frame adjustably positionable between opposite sides of the frame, plows borne by the beam for earth engagement exerting a thrust on the frame during earth traversing movement laterally to the side of the frame opposite that on which their beam is positioned, an adjustably positioned dolly mounted in supporting relation to the rearward end portion of the frame for pivotal movement with respect to the frame about a substantially vertical axis forwardly of the rearward end portion of the beam, a cross arm rigidly mounted transversely on the rearward end portion of the beam, guide means interconnecting the cross arm on opposite sides of the beam with the dolly on opposite sides of its pivotal axis whereby pivotal movement of the beam in the frame results in proportionate pivotal movement of the dolly with respect to the frame and in the same direction as the pivotal movement of the beam, a substantially horizontal shaft mounted transversely of the frame in forwardly spaced relation to the rearward end portion of said frame, a pair of sleeves independently journalled on the shaft at opposite sides of the frame, a leg rigidly connected to each sleeve and extended therefrom for independent pivotal movement of the legs on the shaft between downwardly extended positions and upwardly extended positions, an auxiliary support wheel mounted for earth engagement on the extended end of each leg, a control lever upwardly extended from each sleeve, a control arm corresponding to each of the control levers pivotally mounted on the dolly and upwardly extended therefrom, a pair of push-pull rods swivelly connected to the cross arm on opposite sides of the beam and individually connected to the control arms, and an additional push-pull rod pivotally interconnecting the upwardly extended end of each control arm with the upwardly extended end of its corresponding control lever.

13. An agricultural implement comprising a frame adapted for earth traversing movement along a predetermined line of travel, an elongated tool support beam pivotally connected to the frame for horizontal pivotal movement thereon in opposite directions around an upright pivot axis between opposite operational positions in the frame, a tool borne by the beam adapted upon earth engagement to impart lateral thrusts to the frame in predetermined directions depending on the pivoted position of the beam, a wheel positioning bracket pivotally connected to the frame having transversely extended portions and being pivotal around an upright pivot axis between oppositely angled positions relative to the frame, ground engaging directional control members mounted on the extended portions of the bracket on opposite sides of its pivotal connection to the frame, and linkage means interconnecting the extended portions of the bracket and the beam for pivoting the bracket incident to pivotal movement of the beam thereby to position the directional control members in acute angular relation to the line of travel of the frame so as to oppose thrusts imposed on the frame by the tool.

14. In an agricultural implement, an elongated frame having forward and rearward ends; a tool support beam pivotally mounted in the frame having forward and rearward ends oppositely extended from the pivot and being horizontally movable between opposite operational positions in the frame; earthworking tools mounted on the beam having a thrust in one direction laterally of the frame when engaged with the earth with the beam in one operational position and a thrust in an opposite lateral direction relative to the frame when the beam is in its opposite operational position; a bracket having a pair of rearwardly extended laterally spaced arms pivotally mounted intermediate the arms on the frame forwardly of the plow beam pivot; a shaft extended transversely of the arms having opposite ends; legs connected at opposite ends of the shaft extended rearwardly downwardly therefrom; ground engaging guide wheels rotatably mounted on the legs; and linkages interconnecting the arms of the bracket and the rearward end of the plow beam thereby to angle the bracket and the wheels incident to pivotal movement of the plow beam so that the wheels oppose the lateral thrust set up by the earthworking tools in each of said operational positions.

15. In an agricultural implement, an elongated frame having opposite ends and opposite sides and being adapted for earth traversing movement in a predetermined longitudinal direction, an elongated tool support beam pivotally mounted in the frame for horizontal movement between spaced operational positions on opposite sides of the frame obliquely related to said longitudinal direction, a support wheel mounting member connected to the beam for swivelling movement about an upright axis, a ground engaging support wheel attached to the mounting member for rotation around a substantially horizontal axis in supporting relation to the beam, a control arm rigidly secured to the mounting member and having an end extended therefrom, a substantially T-shaped track mounted in the frame adjacent to the control arm having a central section extended longitudinally centrally of the frame and oppositely extended transverse sections, said track providing a channel continuous between a transverse section and the central section and between said central section and the opposite transverse section, and a roller mounted on the arm confined by the channel of the track for movement along the channel, said channel being shaped to require movement of the roller into the central section in moving from one transverse section to the other whereby movement of the beam between opposite operational positions reversely positions the wheel at opposite sides of the frame in alignment with said earth traversing movement.

16. An agricultural implement adapted for connection to an elevationally adjustable draft means comprising an elongated frame having a forward end connected to the draft means, a rearward end, and opposite sides; a plow beam mounted on the frame for horizontal pivotal movement between opposite operational positions having stop bracket means thereon; a shaft having a longitudinal axis of rotation disposed transversely of the frame and providing opposite ends; means mounting the shaft on the frame for rotation around its longitudinal axis; legs rotatably mounted on opposite ends of the shaft having portions extended forwardly over the stop bracket means on the beam when the beam is at its respective side of the frame and portions rearwardly downwardly extended therefrom; ground engaging wheels mounted on the rearwardly extended portions of the legs; control arms rigidly secured to the shaft engageable with the legs; a lever rigidly connected to the shaft for imparting rotation to the shaft and through the control arms to thrust the rearward ends of the legs downwardly to raise the frame on the wheels; and means interconnecting the lever and the draft means for rotating the shaft incident to elevational movement of the draft means thereby to apply a downward thrust on the legs through the control arms.

17. An agricultural implement comprising a frame, a tool support beam pivotally mounted in the frame for horizontal pivotal movement and having oppositely extended ends, a support wheel mounting member connected adjacent to one end of the beam for swivelling movement about a substantially vertical axis, a support wheel rotatably mounted on the shaft, a support wheel positioning arm extended from the mounting member, means mounted on the frame engaging the arm for swivelly positioning the mounting member incident to beam movement, a substantially horizontally disposed shaft rotatably mounted transversely on the frame for horizontal pivotal movement, legs downwardly extended from the shaft, guide wheels rotatably mounted on the legs, control arms connected to the horizontal shaft and extended for engagement with the legs, means connected to the shaft for controlled rotation thereof, and means connecting the shaft with the end of the beam opposite to the end mounting the support wheel mounting member for pivoting the horizontal shaft incident to beam movement.

18. An agricultural implement comprising a frame, a tool support beam pivotally mounted in the frame for horizontal pivotal movement and having oppositely extended ends, a support wheel mounting member connected adjacent to one end of the beam for swivelling movement about a substantially vertical axis, a support wheel rotatably mounted on the shaft, a support wheel positioning arm extended from the mounting member, means mounted on the frame engaging the arm for swivelling the mounting member incident to beam movement, a substantially horizontally disposed shaft mounted transversely on the frame for horizontal pivotal movement, legs downwardly extended from the shaft, directional control means mounted on the legs, means operatively associated with the legs for controlled application of downward pressure thereon relative to the frame, and means connecting the shaft with the end of the beam opposite to the end mounting the support wheel mounting member for pivoting the horizontal shaft incident to beam movement.

19. An agricultural implement comprising an elongated frame having forward and rearward end portions, an elongated tool support beam having a rearward end portion pivotally mounted in the rearward end portion of the frame and a forward end portion adjustably positionable between opposite sides of the frame, tools borne by the beam for earth engagement, a pair of legs pivotally mounted on the frame forwardly of the rearward end portion thereof for independent movement between downwardly extended positions and relatively upwardly pivoted positions, auxiliary ground engaging frame support means mounted on the extended ends of the legs, and control means individually interconnecting the beam and the legs oppositely pivoting the legs in response to adjustable positioning of the beam alternately to bring the auxiliary frame support means into ground engagement whereby whenever the beam is at a side of the frame the leg adjacent thereto is pivoted upwardly and the opposite leg is downwardly extended with its auxiliary frame support means in ground engagement.

20. In an agricultural implement, a frame, means mounting the frame for earth traversing movement along a predetermined line of travel in relation to the frame, a beam pivotally mounted on the frame for movement between opposite operational positions obliquely related to the line of travel of the frame, a ground support wheel for the beam, means mounting the wheel on the beam in spaced relation to the connection of the beam to the frame for rotation about a substantially horizontal axis and for swivelling movement around a substantially vertical axis, a substantially T-shaped track mounted in the frame adjacent to the support wheel having a central section extended longitudinally of the frame and oppositely transversely extended sections continuous with the central section, a wheel positioning arm having position controlling connection to the wheel and an end disposed adjacent to the track, and track following means on the end of the arm pivoting the arm as the beam is moved between opposite operational positions reversely to position the wheel between positions aligned with said line of travel in each operational position of the beam.

21. In an agricultural implement, a frame, means mounting the frame for earth traversing movement along a predetermined line of travel with respect to the frame, an elongated earth working tool beam pivotally mounted in the frame for movement relative thereto between opposite operational positions obliquely related to said line of travel, a substantially vertically disposed shaft journaled in the beam in spaced relation to the pivotal connection of the beam to the frame, an arm rigidly radially extended from the shaft, a ground engaging support wheel mounted on the shaft in supporting relation to the beam for rotation about a substantially horizontal axis, a substantially T-shaped track mounted in the frame adjacent to the shaft having a central section extended longitudinally of the frame and oppositely transversely extended sections continuous with the central section, and a track follower mounted on the arm in controlled engagement with the track pivoting the arm as the beam is moved between opposite operational positions reversely to position the wheel in alignment with said line of travel in each operational position of the beam.

22. In an agricultural implement, an elongated frame having opposite ends and opposite sides and being adapted for earth traversing movement in a predetermined longitudinal direction, an elongated tool support beam pivotally mounted in the frame for horizontal movement between spaced operational positions on opposite sides of the frame obliquely related to the line of travel, a substantially vertically disposed shaft journaled in the beam for swivelling movement in spaced relation to the pivotal mounting of the beam in the frame, a ground engaging support wheel mounted on the shaft for rotation about a substantially horizontal axis in supporting realtion to the beam, a substantially T-shaped channel track mounted in the frame adjacent to the support wheel having a central section extended longitudinally of the frame and oppositely transversely extended sections continuous with the central section, an arm radially extended from the shaft to a position adjacent to the track, and a roller mounted on the arm engaged in the track whereby movement of the beam between opposite operational positions reversely positions the wheel in alignment with said earth traversing movement.

References Cited in the file of this patent

UNITED STATES PATENTS

| | | |
|---|---|---|
| 2,017,872 | Strandlund | Oct. 22, 1935 |
| 2,203,022 | Kamplade | June 4, 1940 |
| 2,386,378 | Wippel | Oct. 9, 1945 |
| 2,546,554 | McElroy | Mar. 27, 1951 |
| 2,578,942 | Onfrey | Dec. 18, 1951 |
| 2,608,145 | Knapp | Aug. 26, 1952 |
| 2,652,762 | Ashley | Sept. 22, 1953 |
| 2,672,084 | Forgy | Mar. 16, 1954 |
| 2,675,749 | Pursche | Apr. 20, 1954 |
| 2,691,930 | Forgy | Oct. 19, 1954 |
| 2,704,018 | Oehler et al. | Mar. 15, 1955 |
| 2,724,313 | Jennings | Nov. 22, 1955 |